(12) United States Patent
Segawa

(10) Patent No.: US 7,490,695 B2
(45) Date of Patent: Feb. 17, 2009

(54) ELECTRIC POWER STEERING APPARATUS

(75) Inventor: Toru Segawa, Gunma-ken (JP)

(73) Assignee: NSK Ltd., Tokyo (JP)

( * ) Notice: Subject to any disclaimer, the term of this patent is extended or adjusted under 35 U.S.C. 154(b) by 373 days.

(21) Appl. No.: 11/147,364

(22) Filed: Jun. 8, 2005

(65) Prior Publication Data

US 2005/0224278 A1    Oct. 13, 2005

Related U.S. Application Data

(63) Continuation-in-part of application No. PCT/JP2003/015710, filed on Dec. 9, 2003.

(30) Foreign Application Priority Data

Dec. 9, 2002    (JP) ............................. 2002-357165

(51) Int. Cl.
B62D 5/04    (2006.01)
(52) U.S. Cl. ...................................... 180/444
(58) Field of Classification Search ................ 180/443, 180/444, 446; 74/388 PS
See application file for complete search history.

(56) References Cited

U.S. PATENT DOCUMENTS

| | | | | |
|---|---|---|---|---|
| 6,044,723 A * | 4/2000 | Eda et al. | ................. | 74/388 PS |
| 6,357,313 B1 | 3/2002 | Appleyard | .............. | 74/388 PS |
| 6,491,131 B1 | 12/2002 | Appleyard | .................. | 180/444 |
| 6,708,796 B2 | 3/2004 | Kinme et al. | ............... | 180/444 |
| 6,761,244 B2 * | 7/2004 | Sano et al. | .................. | 180/444 |
| 7,188,700 B2 * | 3/2007 | Eda et al. | ..................... | 180/444 |

FOREIGN PATENT DOCUMENTS

| | | |
|---|---|---|
| DE | 3930970 A1 | 3/1991 |
| DE | 41 39 984 A1 | 6/1993 |
| EP | 1335154 A1 | 8/2003 |
| EP | 1452419 A1 | 9/2004 |
| JP | 8-207792 | 8/1996 |
| JP | 11-43062 A | 2/1999 |
| JP | 11-308805 | 11/1999 |
| JP | 2000-211537 | 8/2000 |
| JP | 2001-514122 | 9/2001 |
| JP | 2002-21943 | 1/2002 |
| JP | 2002-518242 | 6/2002 |
| JP | 2002-211421 | 7/2002 |
| JP | 2002-323059 | 11/2002 |
| JP | 2003-261041 A | 9/2003 |
| JP | 2004-058904 | 2/2004 |

* cited by examiner

*Primary Examiner*—Kevin Hurley
(74) *Attorney, Agent, or Firm*—Miles & Stockbridge P.C.

(57) ABSTRACT

A small gap is formed between a worm shaft 3 and a second bearing 20, so that the worm shaft can be tilted relative to the inner ring 20a of the second bearing 20 without fail when preloaded by a torsion spring 14. An elastic member 41 is provided in at least portion of a circumferential groove 40 in the small gap. The worm shaft 3 and the inner ring 20a of the second bearing 20 are not in contact with each other, and their metallic clank in the small gap can be prevented. By providing a projecting portion(s) 3b on one side or both sides, with respect to the axial direction, of the circumferential groove 40, the small gap between the worm shaft 3 and the inner ring 20a of the second bearing 20 can be made large, and it is possible to enlarge the range over which the worm shaft 3 can swing.

24 Claims, 5 Drawing Sheets

ELECTRIC POWER STEERING APPARATUS

CROSS REFERENCE TO RELATED APPLICATION

This application is a continuation-in-part of International Application No. PCT/JP2003/015710 filed Dec. 9, 2003.

TECHNICAL FIELD

The present invention relates to an electric power steering apparatus that generates assist steering torque by an electric motor in response to steering torque applied on the steering wheel and transmits the assist torque to an output shaft of a steering mechanism while reducing it by means of a reduction gear.

BACKGROUND ART

In a known electric power steering apparatus for a vehicle, rotational output of an electric motor for providing assist steering torque is transmitted, while reduced, to an output shaft of the steering apparatus by a gear apparatus to assist the steering force applied to the steering wheel in the wheel steering operation. In such an electric power steering apparatus, the power is transmitted to the output shaft while the rotation of the electric motor is reduced by a power transmission mechanism provided in a housing.

In the electric power steering apparatus that utilizes the aforementioned power transmission mechanism in the form of a worm gear mechanism, backlash will be present between gear surfaces of a worm and a worm wheel, and consecutive gear slapping sound will be generated at the meshing portion.

Conventionally, due to dimension errors of the worm, worm shaft, bearing portions for supporting it, worm wheel and steering shaft for supporting it that might occur in assembling the worm shaft and worm wheel, backlash occurs after assembly at a relatively high rate. Accordingly, it is necessary to assemble the parts while classifying them in accordance with their degrees of precision. Thus, the assembly process is very complicated.

In view of the above, in a known method, elastic members are provided at both ends of the worm shaft so that the worm shaft is movable in the axial direction, to thereby reduce the impact at the meshing portion and to prevent the gear slapping sound.

According to this method, it is also possible to eliminate play by applying a preload to the bearing for supporting the worm shaft in the thrust direction. In particular, this method can improve delay in assistance due to inertia of the electric motor and enhance information on the road condition to maintain good steering feeling, as is well known.

However, when high output steering assist forces have been achieved, as is the case in recent years, wear of the gear surfaces of the worm and the worm wheel is accelerated, and backlash occurs inevitably. In that case, there is a risk that gear slapping sound due to the backlash may enter the vehicle cabin.

In the above circumstances, there is a known method in which backlash is eliminated by biasing the worm toward the worm wheel (i.e. in the meshing direction) with appropriate means to apply preload.

In applying preload to the worm in the direction toward the worm wheel, it is necessary that tilting (or swinging) of the worm shaft relative to the inner ring or outer ring of the bearing that supports the worm shaft be allowed.

Japanese Patent Application Laid-Open No. 2002-21943 discloses an apparatus in which a projection is formed on a worm shaft inside the inner ring of the bearing that supports the worm shaft so that the worm shaft can be tilted (or can swing) with the projection being the supporting point.

Japanese Patent Application Laid-Open No. 2002-211421 discloses an apparatus in which a self-aligning bearing is used as a bearing for supporting a worm shaft so that the worm shaft can be tilted (or can swing) with the self-aligning bearing being the supporting point.

However, in the apparatus disclosed in Japanese Patent Application Laid-Open No. 2002-21943, since both the worm and the worm shaft are made of a metal, when a radial load is generated in the worm shaft, the worm shaft and the inner ring of the bearing sometimes come in contact with each other in the small gap existing between the worm shaft and the inner ring to generate metallic clank. In addition, it is difficult to control the dimension of the small gap, and it may lead to a significant increase in the manufacturing cost.

Furthermore, since the projection formed on the worm shaft slides on the inner shaft of the bearing, it will be worn and the (small) gap between the worm shaft and the inner ring of the bearing will be enlarged.

In the apparatus disclosed in Japanese Patent Application Laid-Open No. 2002-211421, with the provision of the self-aligning bearing, allowable load in the axial direction of the bearing is low as compared to that of the single row deep groove ball bearing. Accordingly, an increase in the apparatus size is inevitable and a high precision in machining is required, which leads to a significant increase in the manufacturing cost.

DISCLOSURE OF THE INVENTION

The present invention has been made in view of the above-described circumstances. An object of the present invention is to provide an electric power steering apparatus in which the worm shaft can be tilted (or can swing) relative to the inner ring of the bearing and metallic clank caused by the worm shaft and the inner ring of the bearing in the small gap between them can be reliably prevented without requiring a high precision in machining and without inviting a significant increase in the manufacturing cost.

To achieve the above-described object, according to the present invention, there is provided an electric power steering apparatus that generates an assist steering torque by an electric motor in response to a steering torque applied on a steering wheel and transmits it to an output shaft of a steering mechanism while reducing it by means of a reduction gear, which is characterized by that a drive gear shaft in said reduction gear is supported at its both ends by a first and second bearings respectively, preload means for preloading said drive gear shaft toward meshing direction with a driven gear is provided in or in the vicinity of said first bearing, a small gap is formed between said drive gear shaft and an inner ring of said second bearing to allow said drive gear shaft to be tilted relative to said inner ring of the second bearing, and a buffer member is provided in at least a portion of said small gap.

In the electric power steering apparatus according to the present invention, said buffer member may be an elastic member elastically received in a circumferential groove formed on said drive gear shaft or the inner ring of said second bearing.

According to the present invention, the drive gear shaft in the reduction gear is supported at both ends by the first and second bearings respectively, and preload means for preloading the drive gear shaft toward the meshing direction with the driven gear is provided in or in the vicinity of the first bearing. Accordingly, backlash can be reduced by preloading of the drive gear shaft toward the meshing direction with the driven gear.

Furthermore, a small gap for allowing the drive gear shaft to be tilted relative to the inner ring of the second bearing is formed between the drive gear shaft and the inner ring of the second bearing. Accordingly, the drive gear shaft can be tilted (or can swing) relative to the inner ring of the second bearing without fail upon the aforementioned preload.

Still further, with the provision of the buffer member at least in a portion of the small gap, the drive gear shaft is in a floating state relative to the inner ring of the second bearing when no load is applied thereon. Accordingly, the drive gear shaft and the inner ring of the second bearing will not come in contact with each other, and it is possible to positively prevent metallic clank caused by them in the small gap.

Still further, high machining precision or strict dimension control is not required, and a significant increase in the manufacturing cost will not result.

In the electric power steering apparatus according to the present invention, it is preferred that the buffer member be an elastic member elastically received in a circumferential groove formed on the drive gear shaft or the inner ring of the second bearing. In this case, the elastic member is compressed to generate a repulsive force in response to a radial displacement of the drive gear shaft.

In connection with this, if a light load caused by an input from the road surface etc. is applied on the drive gear shaft, a radial load is generated to cause a displacement of the drive gear shaft. However, the load is received by the elastic member, and so the drive gear shaft and the inner ring of the second bearing will not be brought into direct contact with each other. Accordingly, metallic clank can be prevented reliable from occurring.

Furthermore, if a heavy load generated by the assisting operation of the electric motor etc. is applied on the drive gear shaft, the drive gear shaft and the inner ring of the second bearing come into contact with each other to receive the load. However, its speed is reduced by the elastic member, and the contact sound will not matter seriously. In addition, since the drive gear shaft receives uniform load from the second bearing, the drive gear shaft can be held in a favorable state relative to the second bearing.

In the electric power steering apparatus according to the present invention, it is preferred that the elastic member is formed integrally with a solid lubricant, typified by Teflon (registered trademark), in a circumferential groove formed on the drive gear shaft or the inner ring of the second bearing. Since friction between the drive gear shaft and the inner ring of the second bearing is reduced by the solid lubricant, the drive gear shaft can be shifted (or tilted) more smoothly. Thus, wear resistance is improved, and durability is enhanced.

In the electric power steering apparatus according to the present invention, the preload means may preferably be adapted to preload the outer ring of said first bearing in the meshing direction with said driven gear by an elastic member to eliminate backlash.

In the electric power steering apparatus according to the present invention, a projecting portion may preferably be formed annually along the circumferential direction on an outer circumferential surface of said drive gear shaft or on an inner circumferential surface of the inner ring of said second bearing, on both sides or one side, with respect to the axial direction, of said circumferential groove to leave a small gap between the outer circumferential surface of the drive gear shaft and the inner circumferential surface of the inner ring of the second bearing.

According to this preferred mode of the present invention, it is possible to leave a large gap between the drive gear shaft and the second bearing, and it is possible to enlarge the range over which the drive gear shaft can swing.

In connection with this, although when the electric motor generates an assist torque, the drive gear is displaced in the radial direction, such displacement is limited by the projecting portion. Accordingly, the coaxiality of the drive gear shaft and the second bearing will not be deteriorated greatly. Therefore, misalignment of the drive gear shaft and the drive shaft of the electric motor can be restricted to the minimum.

BRIEF DESCRIPTION OF THE DRAWINGS

FIG. 5A is a cross sectional view showing an arrangement in which a projecting portion is provided on the worm side of the circumferential groove, FIG. 5B is a cross sectional view showing an arrangement in which projecting portions are provided on both sides of the circumferential groove, and FIG. 5C is a cross sectional view showing an arrangement in which a projecting portion is provided on the motor side of the circumferential groove.

FIG. 6A is a cross sectional view showing an arrangement in which the projecting portion is provided integrally with the inner ring, and FIG. 6B is a cross sectional view showing an arrangement in which the projecting portion is provided separately from the inner ring.

EMBODIMENTS OF THE INVENTION

In the following, an electric power steering apparatus according to an embodiment of the present invention will be described with reference to the drawings.

(Overall Structure of the Electric Power Steering Apparatus)

Figure 1:
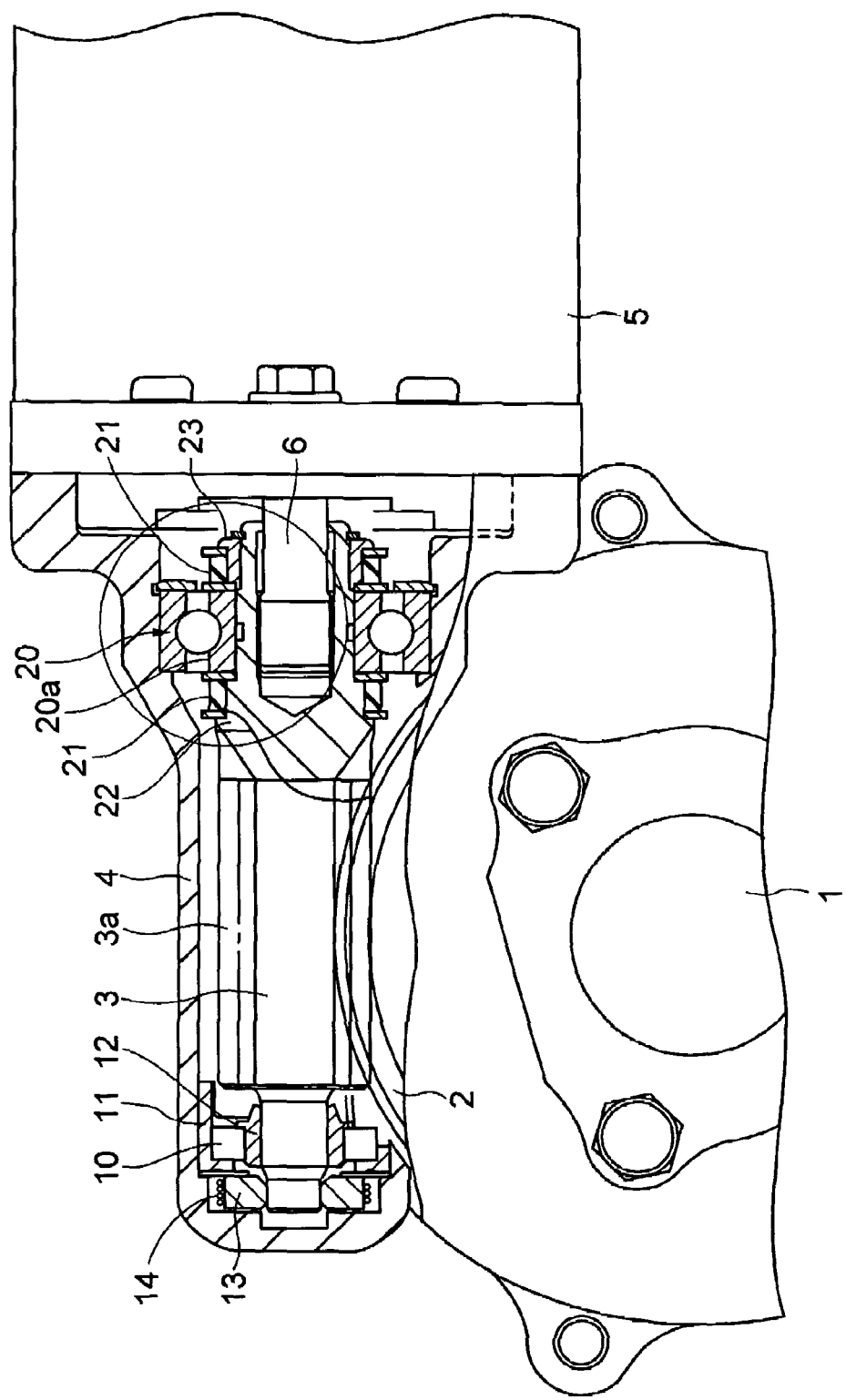
FIG. 1 is a longitudinal cross sectional view of an electric power steering apparatus according to the present invention.

FIG. 1 is a longitudinal cross sectional view of the electric power steering apparatus according to the present invention.

As shown in FIG. 1, an output shaft 1 is connected with an input shaft (not shown), which is coupled with a steering wheel (not shown), by means of a torsion bar (not shown). A worm wheel 2 of a worm gear reduction mechanism is fixedly mounted on the output shaft 1.

A worm 3a is in engagement with the worm wheel 2. A worm shaft 3 for the worm 3a is supported at its both ends by means of first and second bearings 10 and 20.

The housing 4 for the worm gear reduction mechanism is made integral with an electric motor 5, and the worm shaft 3 is connected with the drive shaft 6 of the electric motor 5 by means of spline. More specifically, the end portion of the inner surface of the worm shaft 3 is splined so as to be fitted, at least partially, with male splines on the end portion of the drive shaft 6 of the electric motor 5 within the width of a second bearing 20 so that tilting of the drive shaft 6 of the electric motor 5 and the worm shaft 3 is allowed by play between them.

The first bearing 10 is fixedly mounted on the housing by means of a holder 11. A bush 12 is provided on the inner ring of the first bearing 10. A gap is present between the inner surface of the bush 12 and the worm shaft 3.

A preload pad 13 is fitted with the worm shaft 3 at the center. The preload pad 13 exerts a preload force on the worm shaft 3 by an unwinding force of a torsion spring 14 that is wound on the outer circumference of the preload pad 13 coaxially with a bearing hole. In this way, backlash can be reduced by preloading the worm shaft 3 toward the meshing direction with the worm wheel 2.

The second bearing 20 is adapted to elastically support the worm shaft 3 coaxially therewith by support means including a pair of rubber dampers (support members) 21, 21 that are respectively compressed between end faces of the second bearing 20 and a flange 22 integrally formed at a mid position on the worm shaft 3, and a nut 23 fixed on the end of the worm shaft 3 by means of a screw and caulking (or clinching) or ring fastener.

Thus, the worm shaft 3 is movable along the axial direction relative to the second bearing 20 within the range allowed by the elasticity of the rubber dampers 21.

First Embodiment

Figure 2:
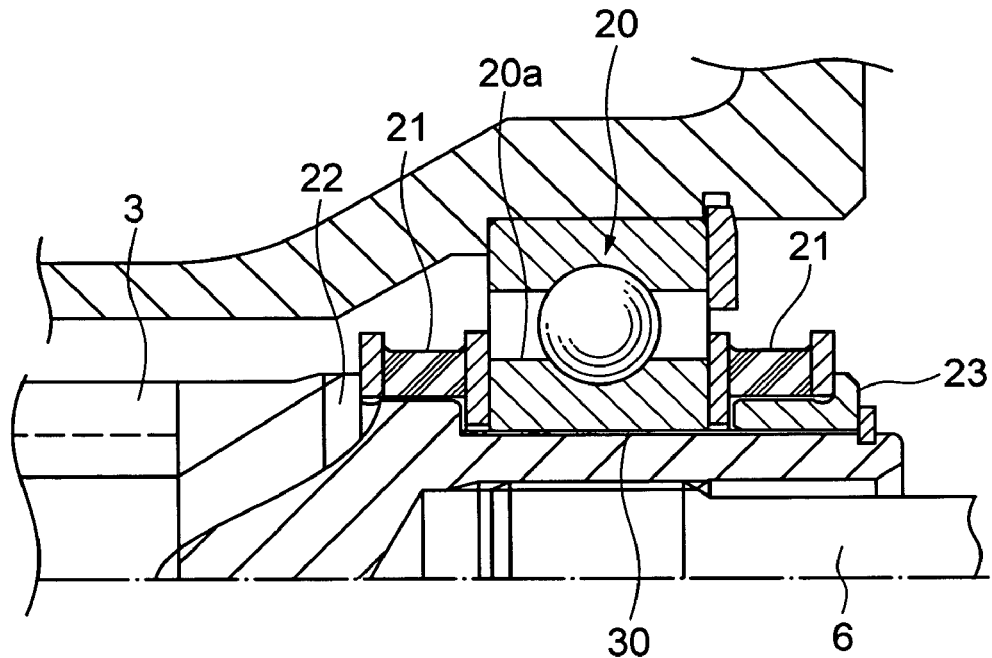
FIG. 2 is a cross sectional view showing a principal portion (corresponding to the encircled portion in FIG. 1) of an electric power steering apparatus according to a first embodiment of the present invention.

FIG. 2 is a cross sectional view showing a principal portion (corresponding to the encircled portion in FIG. 1) of the electric power steering apparatus according to the first embodiment of the a present invention.

A small gap is formed between the worm shaft 3 and the inner circumference of the inner ring 20a of the second bearing 20 so as to allow tilting of the worm shaft 3 relative to the inner ring 20a of the second bearing. With this feature, the worm shaft 3 can be tilted (or can swing) relative to the inner ring 20a of the second bearing 20 without fail upon application of preload by the torsion spring 14.

When the worm shaft 3 is tilted or displaced in the radial direction, a shearing stress is generated in the rubber damper 21 to create a reaction force acting to make it coaxial with the second bearing 20.

In at least portion of the small gap, there is provided a buffer member 30 for avoiding sound generated when the worm shaft 3 receives a radial load to come in contact with the inner ring 20a of the second bearing 20. Therefore, even when a load caused by an input from the road surface or a load generated by the assisting operation of the electric motor 5 is applied on the worm shaft 3 and a radial load is generated to bring the worm shaft 3 to a position at which it is in contact with the inner ring 20a of the second bearing 20, its impact is absorbed by the buffer member 30. Thus, the contact sound does not matter.

In connection with this, it is preferred that the buffer member be made of a resin containing a solid lubricant in view of generation of friction between the worm shaft 3 and the inner ring 20a of the worm shaft 20.

Second Embodiment

Figure 3:
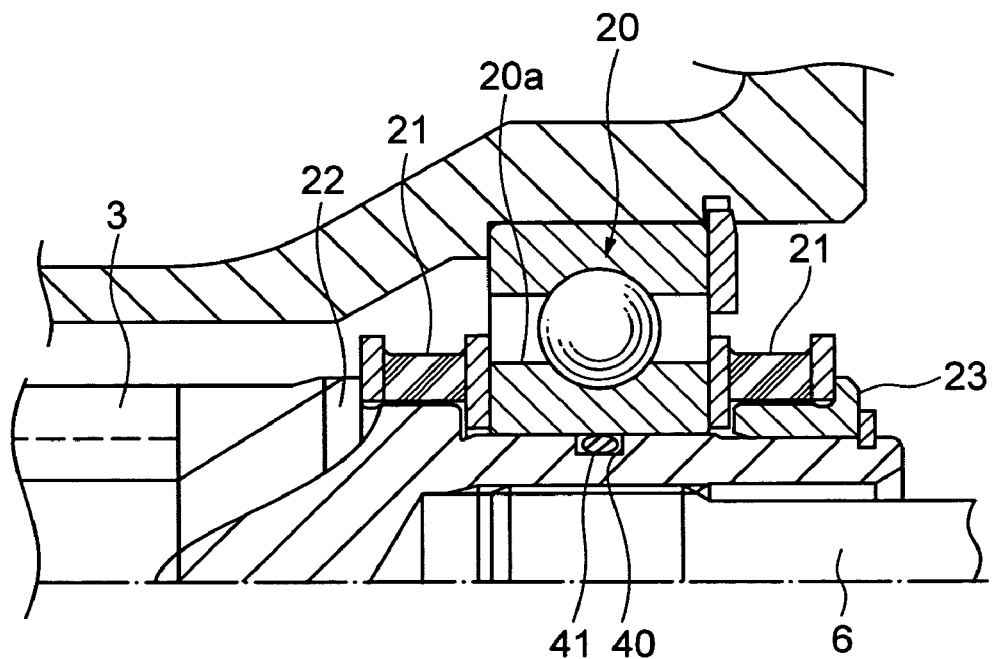
FIG. 3 is a cross sectional view showing a principal portion (corresponding to the encircled portion in FIG. 1) of an electric power steering apparatus according to a second embodiment of the present invention.

FIG. 3 is a cross sectional view showing a principal portion (corresponding to the encircled portion in FIG. 1) of the electric power steering apparatus according to the second embodiment of the present invention.

In contrast to the first embodiment, a circumferential groove 40 is formed on the outer circumferential surface of the worm shaft 3 radially inside the inner ring 20a of the second bearing 20.

An O-ring 41 serving as an elastic member is fitted in the circumferential groove 40. The O-ring 41 is compressed between the inner ring 20a of the second bearing 20 and the worm shaft 3 to generate a repulsive force in response to radial displacement of worm shaft 3, the repulsive force being uniform all along the circumference. Thus, the worm shaft 3 can stay in a floating state relative to the inner ring 20a of the second bearing 20, so that the worm shaft 3 and the inner ring 20a of the worm shaft 3 will not come in contact with each other.

In connection with this, if a light load caused by an input from the road surface etc. is applied on the worm shaft 3, a radial load is generated to cause a displacement of the worm shaft 3. However, the load is received by the elastic member (O-ring 41), and so the worm shaft 3 and the inner ring 20a of the second bearing 20 will not be brought into direct contact with each other. Accordingly, it is possible to reliably prevent metallic clank caused by them in the small gap.

Furthermore, if a heavy load generated by the assisting operation of the electric motor 5 etc. is applied on the worm shaft 3, the worm shaft 3 and the inner ring 20a of the second bearing 20 come into contact with each other to receive the load. However, its speed is reduced by the elastic member (the O-ring 41), and the contact sound will not matter seriously. In addition, since the worm shaft 3 receives uniform load from the second bearing 20, the worm shaft can be held in a favorable state relative to the second bearing 20.

The circumferential groove in which the elastic member in the form of the O-ring 41 is set may be formed on the inner ring 20a of the second bearing 20.

Third Embodiment

Figure 4A:
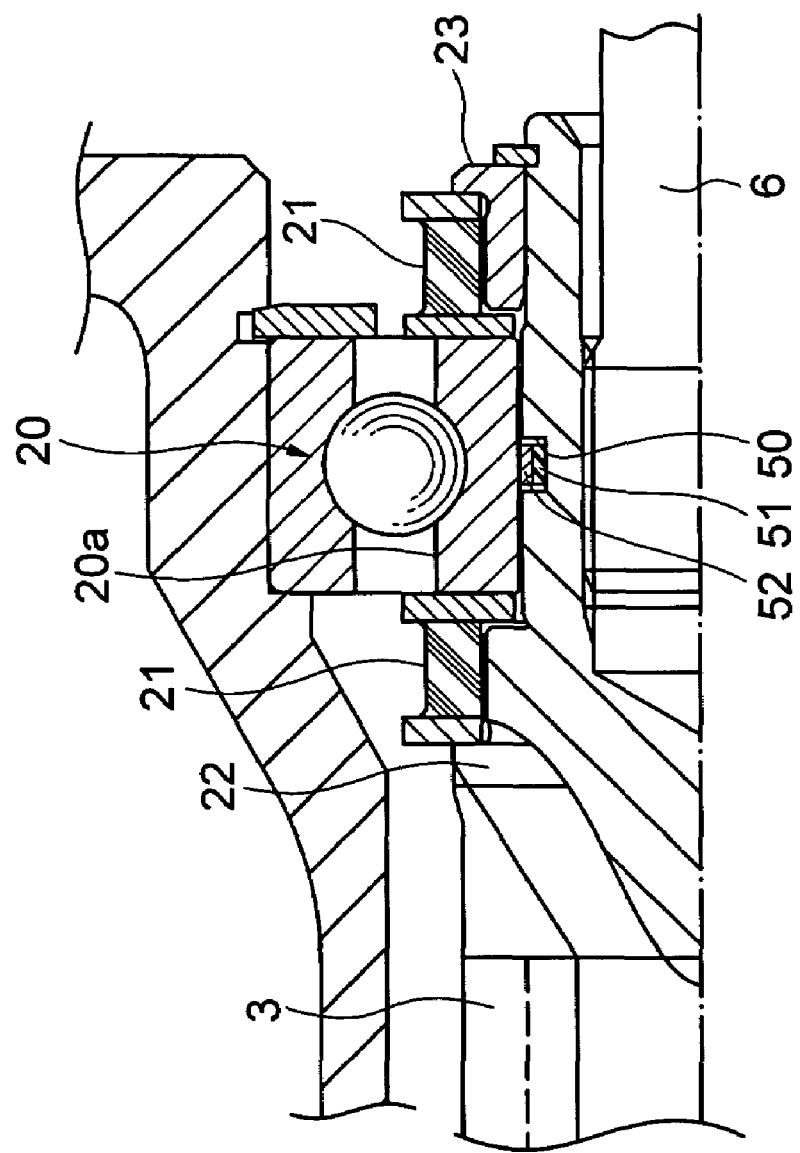
FIG. 4A is a cross sectional view showing a principal portion (corresponding to the encircled portion in FIG. 1) of an electric power steering apparatus according to a third embodiment of the present invention.
Figure 4B:
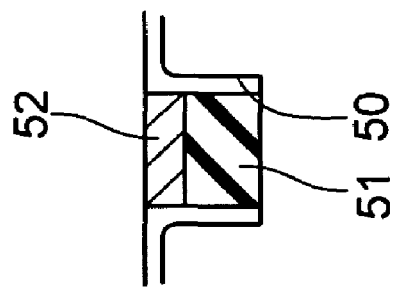
FIG. 4B is a partial cross sectional view showing a circumferential groove, an elastic member and a solid lubricant.

FIG. 4A is a cross sectional view showing a principal portion (corresponding to the encircled portion in FIG. 1) of the electric power steering apparatus according to the third embodiment of the present invention. FIG. 4B is a partial cross sectional view showing a circumferential groove, an elastic member and a solid lubricant.

In contrast to the second embodiment, an elastic member 51 is formed integrally with a solid lubricant 52, typified by Teflon (registered trademark), in a circumferential groove 50 formed on the outer circumferential surface of the worm shaft 3 radially inside the inner ring 20a of the second bearing 20.

Since friction between the worm shaft 3 and the inner ring 20a of the second bearing 20 is reduced by the solid lubricant 52, the worm shaft 3 can be shifted or tilted more smoothly. Thus, wear resistance is improved, and durability is enhanced.

The solid lubricant 52 may be formed integrally with the elastic member 51 on one of or both the contact surfaces of the elastic member 51 and the worm shaft 3 or the inner ring 20a of the second bearing 20.

Fourth Embodiment

Figure 5A:
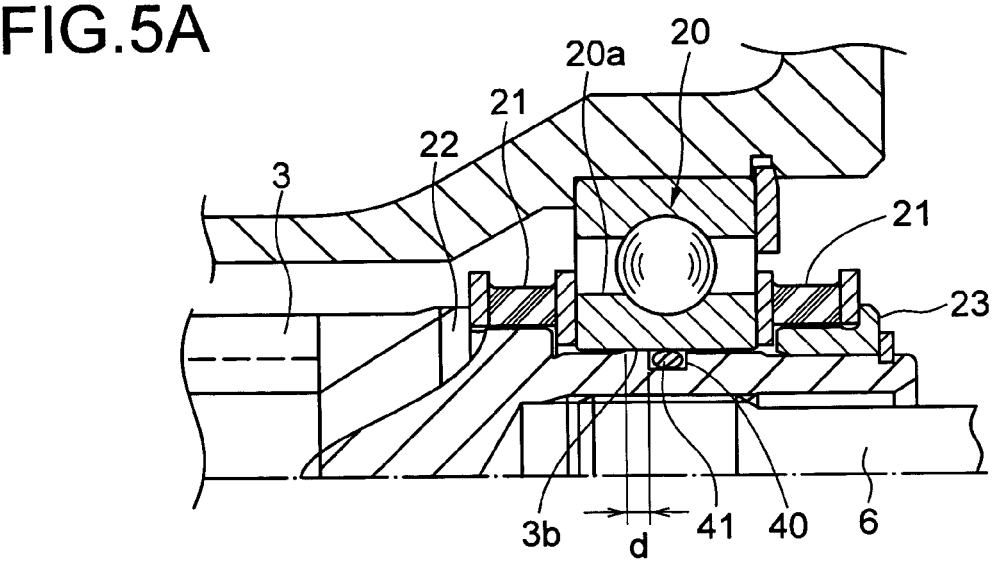
FIGS. 5A to 5C are cross sectional views of a principal portion (corresponding to the encircled portion in FIG. 1) of the electric power steering apparatus according to the fourth embodiment of the present invention, in which a projecting portion(s) is provided on the worm shaft.
Figure 5B:
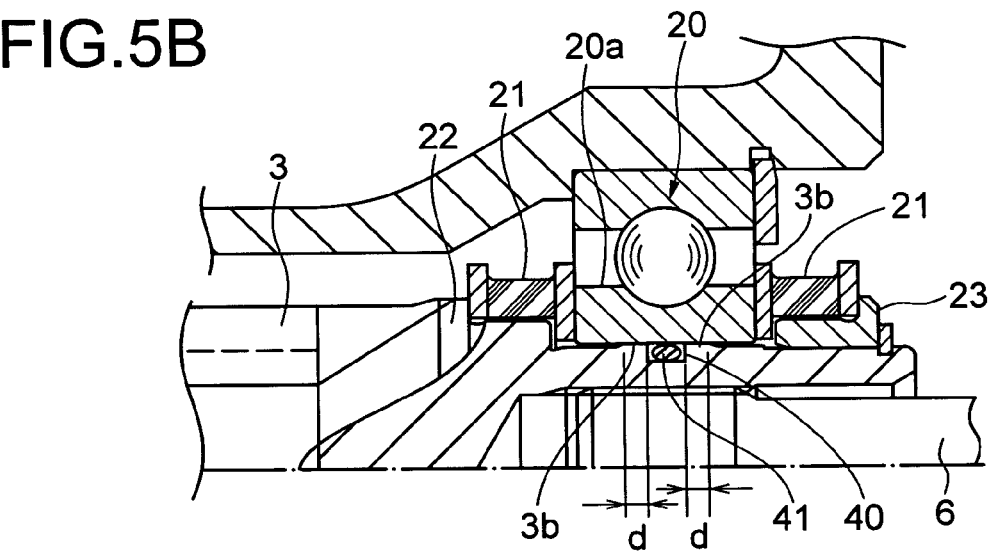
Figure 5C:
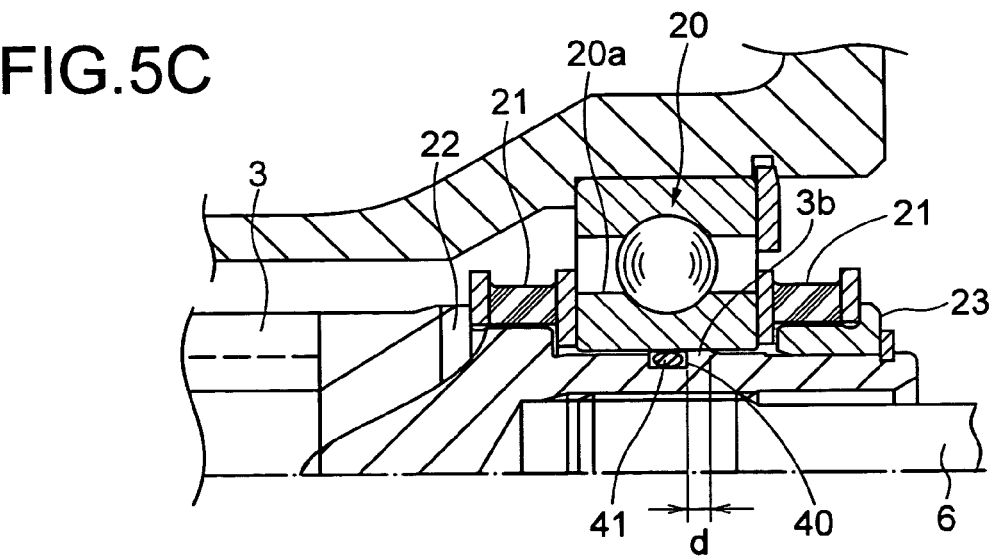

FIGS. 5A to 5C are cross sectional views of a principal portion (corresponding to the encircled portion in FIG. 1) of the electric power steering apparatus according to the fourth embodiment of the present invention, in which a projecting portion(s) is provided on the worm shaft. FIG. 5A shows an arrangement in which a projecting portion is provided on the worm side of the circumferential groove, FIG. 5B shows an arrangement in which projecting portions are provided on both sides of the circumferential groove, and FIG. 5C shows an arrangement in which a projecting portion is provided on the motor side of the circumferential groove.

As shown in FIG. 5A, in contrast to the second embodiment, a projecting portion 3b is formed at the worm 3a side (with respect to the axial direction) edge of the circumferential groove 40 of the worm shaft 3 annually along the circumferential direction with a width d. With this projecting portion 3b, a small gap is formed between the outer circumference of the worm shaft 3 and the inner circumferential surface of the inner ring 20a of the second bearing 20, which constitutes the circumferential surface opposed thereto, in the vicinity of the projecting portion 3b.

The small gap formed by the projecting portion 3b allows tilting of the worm shaft 3 relative to the second bearing 20 to some extent. By providing the projecting portion 3b, it is possible to make the gap between the worm shaft 3 and the inner ring 20a of the bearing 20 large, and therefore it is possible to enlarge the range over which the worm shaft 3 can wing.

When the motor 5 generates an assist torque, the worm 3a receives a reactive force in the radial direction and is displaced in the radial direction. However, since such displacement is limited by the projecting portion 3b, the coaxiality of the worm shaft 3 and the second bearing 20 will not be deteriorated greatly. Therefore, misalignment of the worm shaft 3 and the drive shaft 6 of the motor 5 can be restricted to the minimum.

Furthermore, since when no load is applied, the worm shaft 3 is in a floating state relative to the inner ring 20a of the second bearing 20 by virtue of the elastic member 41, the worm shaft 3 will not come in contact with the inner ring 20a of the second bearing 20 when a light load caused by an input from the road surface etc. is applied on the worm 3a and a radial load is applied on the worm shaft 3. Thus, their metallic clank can be reliably prevented.

In addition, since coaxiality of the worm shaft 3 with the second bearing 30 can be always maintained excellently, the worm 3a can swing smoothly.

The position of the projecting portion 3b in the fourth embodiment is not limited to this, but projecting portions may be formed on both axial sides of the circumferential groove 40 of the worm shaft 3 with each width d as shown in FIG. 5B. Alternatively, it may be formed at the motor 5 side (with respect to the axial direction) edge of the circumferential groove 40 of the worm shaft 3 with a width d, as shown in FIG. 5C. In both of the embodiments shown in FIGS. 5B and 5C, a small gap is provided between the inner circumferential surface of the inner ring 20a of the second bearing 20 and the outer circumferential surface of the worm shaft 3 by virtue of the projecting portion 3b.

Both of the embodiments shown in FIGS. 5B and 5C are expected to achieve the advantageous effects same as the above-described arrangement shown in FIG. 5A.

The arrangement in which the projecting portion 3b is provided on the inner ring 20a of the second bearing 20 may also be adopted.

Figure 6A:
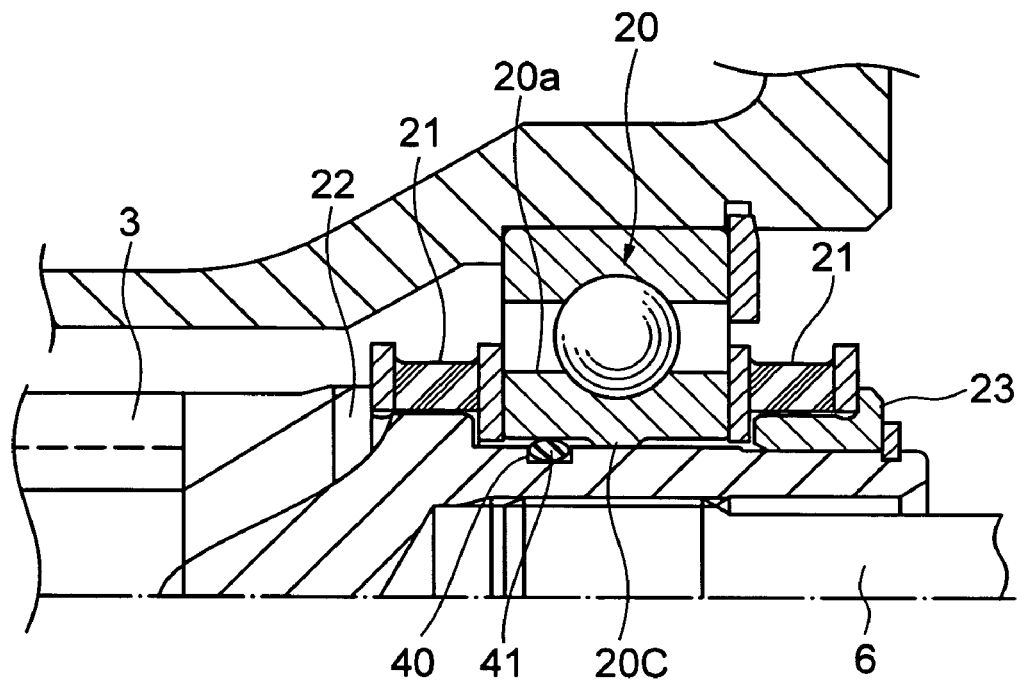
FIGS. 6A and 6B are cross sectional views showing a principal portion (corresponding to the encircled portion in FIG. 1) of the electric power steering apparatus according to the fourth embodiment, in which a projecting portion(s) is provided on the second bearing.
Figure 6B:
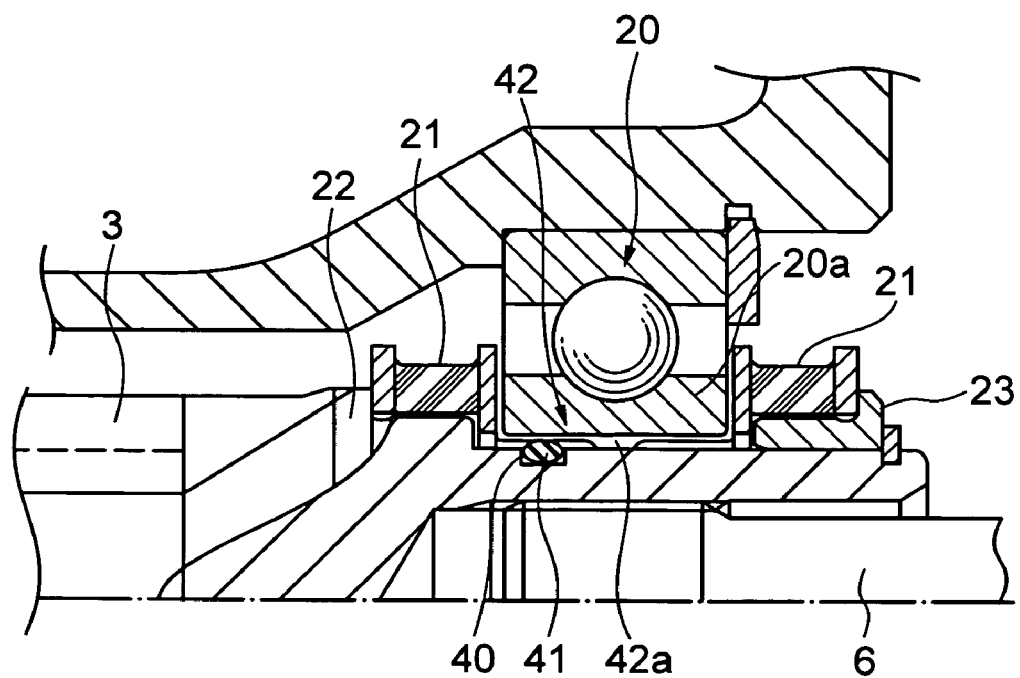

FIGS. 6A and 6B are cross sectional views showing a principal portion (corresponding to the encircled portion in FIG. 1) of the electric power steering apparatus according to the fourth embodiment, in which a projecting portion(s) is provided on the second bearing. FIG. 6A shows an arrangement in which the projecting portion is provided integrally with the inner ring, and FIG. 6B shows an arrangement in which the projecting portion is provided separately from the inner ring.

As shown in FIG. 6A, a projecting portion 20c is formed on the inner circumferential surface of the inner ring 20a of the second bearing 20 (the projecting portion 20c being formed integrally with the inner ring 20a). In the case of this embodiment, the projecting portion 20c is provided at the center, with respect to the axial direction, of the inner ring 20c, and so the circumferential groove 40 of the worm shaft 3 and the O-ring 41 externally fitted therein is provided on the worm 3a side of the projecting portion 20c.

Alternatively, in providing a projection on the inner ring 20a of the second bearing 20 in a similar manner as in FIG. 6A, a projecting portion 42a may be provided on a annular bush 42 as a member separate from the inner ring, and the bush 42 may be fitted inside the inner ring 20. In this case also, the projecting portion 42a is provided at the center, with respect to the axial direction, of the inner ring as with the arrangement shown in FIG. 6A. Accordingly, the circumferential groove 40 of the worm shaft 3 and the O-ring 41 externally fitted therein are provided on the worm 3a side of the projecting portion 42a. In both of the embodiments shown in FIGS. 6A and 6B, a small gap is provided between the projecting portion 20c (projecting portion 42a) and the outer circumferential surface of the worm shaft 3.

Both of the embodiments shown in FIGS. 6A and 6B are expected to achieve the advantageous effects same as the above-described arrangement shown in FIG. 5A.

The present invention is not limited to the above described embodiments, and various modifications may be made.

What is claimed is:

1. An electric power steering apparatus that generates an assist steering torque by an electric motor in response to a steering torque applied on a steering wheel and transmits it to an output shaft of a steering mechanism while reducing it by means of a reduction gear, comprising:

a drive gear shaft in said reduction gear that has a distal end portion and a proximal end portion, the proximal end portion being connected to an output shaft of the electric motor so as to transmit torque from the electric motor output shaft to the drive gear shaft;

a first bearing device supported in a housing of the reduction gear and supporting the distal end portion of the drive gear shaft;

a second bearing device supported in said housing and including a rolling bearing arranged about the proximal end portion of the drive gear shaft with a small gap in a radial direction of the drive gear shaft;

a driven gear supported on the steering mechanism output shaft and engaging, between the first and second bearing devices, with a worm gear supported on the drive gear shaft;

preload means disposed in a vicinity of the first bearing device for preloading the drive gear shaft in a meshing direction of the worm gear with the driven gear; and support means cooperable with the second bearing device for elastically supporting the drive gear shaft such that the drive gear shaft is coaxial with the second bearing device and tiltable relative to a portion of the second bearing device.

2. An electric power steering apparatus according to claim 1, wherein the support means includes elastic means disposed between the drive gear shaft and the rolling bearing so as to transmit torque therebetween, the elastic means being cooperable with the second bearing device to support the drive gear shaft such that the drive gear shaft is movable relative to the rolling bearing in an axial direction and in said radial direction.

3. An electric power steering apparatus according to claim 1, including an elastic member compressed in said radial direction between an inner ring of the rolling bearing and the drive gear shaft.

4. An electric power steering apparatus according to claim 1, wherein said preload means includes an elastic member that preloads an outer ring of said first bearing device in said meshing direction.

5. An electric power steering apparatus according to claim 1, wherein an annular projection is formed on an outer circumferential surface of said drive gear shaft or on an inner circumferential surface of an inner ring of said second bearing device such that a small gap is provided between the outer circumferential surface of the drive gear shaft and the inner circumferential surface of the inner ring of the second bearing device.

6. An electric power steering apparatus according to claim 4, wherein an annular projection is formed on an outer circumferential surface of said drive gear shaft or on an inner circumferential surface of an inner ring of said second bearing device, such that a small gap is provided between the outer circumferential surface of the drive gear shaft and the inner circumferential surface of the inner ring of the second bearing device.

7. An electric power steering apparatus according to claim 1, wherein said support means includes elastic members disposed on both sides of the second bearing device in an axial direction of the drive gear shaft.

8. An electric power steering apparatus according to claim 1, wherein said preload means includes a preload pad for directly biasing said drive gear shaft in said meshing direction.

9. An electric power steering apparatus according to claim 2, wherein said preload means includes an elastic member that preloads an outer ring of said first bearing device in said meshing direction.

10. An electric power steering apparatus according to claim 3, wherein said preload means includes an elastic member that preloads an outer ring of said first bearing device in said meshing direction.

11. An electric power steering apparatus according to claim 2, wherein an annular projection is formed on an outer circumferential surface of said drive gear shaft or on an inner circumferential surface of an inner ring of said second bearing device such that a small gap is provided between the outer circumferential surface of the drive gear shaft and the inner circumferential surface of the inner ring of the second bearing device.

12. An electric power steering apparatus according to claim 3, wherein an annular projection is formed on an outer circumferential surface of said drive gear shaft or on an inner circumferential surface of an inner ring of said second bearing device such that a small gap is provided between the outer circumferential surface of the drive gear shaft and the inner circumferential surface of the inner ring of the second bearing device.

13. An electric power steering apparatus according to claim 2, wherein said preload means includes a preload pad for directly biasing said drive gear shaft in said meshing direction.

14. An electric power steering apparatus according to claim 3, wherein said preload means includes a preload pad for directly biasing said drive gear shaft in said meshing direction.

15. An electric power steering apparatus according to claim 9, wherein an annular projection is formed on an outer circumferential surface of said drive gear shaft or on an inner circumferential surface of an inner ring of said second bearing device such that a small gap is provided between the outer circumferential surface of the drive gear shaft and the inner circumferential surface of the inner ring of the second bearing device.

16. An electric power steering apparatus according to claim 10, wherein an annular projection is formed on an outer circumferential surface of said drive gear shaft or on an inner circumferential surface of an inner ring of said second bearing device such that a small gap is provided between the outer circumferential surface of the drive gear shaft and the inner circumferential surface of the inner ring of the second bearing device.

17. An electric power steering apparatus that generates an assist steering torque by an electric motor in response to a steering torque applied on a steering wheel and transmits it to an output shaft of a steering mechanism while reducing it by means of a reduction gear, comprising:
  a drive gear shaft in said reduction gear that has a distal end portion and a proximal end portion, the proximal end portion being connected to an output shaft of the electric motor so as to transmit torque from the electric motor output shaft to the drive gear shaft;
  a first bearing device supported in a housing of the reduction gear and supporting the distal end portion of the drive gear shaft;
  a second bearing device supported in the housing and including a rolling bearing arranged about the proximal end portion of the drive gear shaft with a small gap in a radial direction of the drive gear shaft;
  a driven gear supported on the steering mechanism output shaft and engaging, between the first and second bearing devices, with a worm gear supported on the drive gear shaft;
  a preload device disposed in a vicinity of the first bearing device for preloading the drive gear shaft in a meshing direction of the worm gear with the driven gear; and
  support members cooperable with the second bearing device for elastically supporting the drive gear shaft such that the drive gear shaft is coaxial with the second bearing device and tiltable relative to a portion of the second bearing device.

18. An electric power steering apparatus according to claim 17, wherein the support members include elastic members disposed between the drive gear shaft and the rolling bearing so as to transmit torque therebetween, the elastic members being cooperable with the second bearing device to support the drive gear shaft such that the drive gear shaft is movable relative to the rolling bearing in an axial direction and in said radial direction.

19. An electric power steering apparatus according to claim 17, including an elastic member compressed in said radial direction between an inner ring of the rolling bearing and the drive gear shaft.

20. An electric power steering apparatus according to claim 17, wherein the preload device includes an elastic member that preloads an outer ring of said first bearing device in said meshing direction.

21. An electric power steering apparatus according to claim 17, wherein an annular projection is formed on an outer circumferential surface of said drive gear shaft or on an inner circumferential surface of an inner ring of said second bearing device such that a small gap is provided between the outer circumferential surface of the drive gear shaft and the inner circumferential surface of the inner ring of the second bearing device.

22. An electric power steering apparatus according to claim 20, wherein an annular projection is formed on an outer circumferential surface of said drive gear shaft or on an inner circumferential surface of an inner ring of said second bearing device, such that a small gap is provided between the outer circumferential surface of the drive gear shaft and the inner circumferential surface of the inner ring of the second bearing device.

23. An electric power steering apparatus according to claim 17, wherein the support members include elastic members disposed on both sides of the second bearing device in an axial direction of the drive gear shaft.

24. An electric power steering apparatus according to claim 17, wherein the preload device includes a preload pad for directly biasing said drive gear shaft in said meshing direction.

* * * * *